United States Patent
Uysal et al.

(10) Patent No.: US 11,566,557 B2
(45) Date of Patent: Jan. 31, 2023

(54) EXHAUST SYSTEM FOR AN INTERNAL COMBUSTION ENGINE AND PROCESS FOR MANUFACTURING AN EXHAUST SYSTEM

(71) Applicant: Purem GmbH, Neunkirchen (DE)

(72) Inventors: Fatih Uysal, Plochingen (DE); Enver Kurpejovic, Kirchheim (DE); Dietmar Uebele, Deizisau (DE)

(73) Assignee: PUREM GMBH, Neunkirchen (DE)

( * ) Notice: Subject to any disclaimer, the term of this patent is extended or adjusted under 35 U.S.C. 154(b) by 0 days.

(21) Appl. No.: 17/088,202

(22) Filed: Nov. 3, 2020

(65) Prior Publication Data

US 2021/0131328 A1 May 6, 2021

(30) Foreign Application Priority Data

Nov. 5, 2019 (DE) .................... 10 2019 129 795.8

(51) Int. Cl.
*F01N 13/18* (2010.01)

(52) U.S. Cl.
CPC ...... *F01N 13/1827* (2013.01); *F01N 2240/16* (2013.01)

(58) Field of Classification Search
CPC ............... F01N 3/2013; F01N 3/2026; F01N 13/1827; F01N 2240/16
See application file for complete search history.

(56) References Cited

U.S. PATENT DOCUMENTS

| 5,887,427 A * | 3/1999 | Maus ............... F01N 3/2026 422/174 |
| 6,025,578 A * | 2/2000 | Bruck ............... F01N 3/2026 422/177 |
| 6,031,213 A | 2/2000 | Hashimoto et al. |
| 10,190,463 B2 | 1/2019 | Kurpejovic et al. |
| 10,458,301 B2 | 10/2019 | Vempati et al. |
| 2015/0152766 A1 | 6/2015 | Brunel |
| 2017/0016370 A1 | 1/2017 | Schlipf |

FOREIGN PATENT DOCUMENTS

| CN | 102553435 A | 7/2012 |
| CN | 103068470 A | 4/2013 |
| CN | 106351719 A | 1/2017 |
| CN | 106358322 A | 1/2017 |
| CN | 108071453 A | 5/2018 |
| DE | 69533609 T2 | 10/2005 |
| DE | 102011088569 A1 | 6/2013 |
| EP | 0848785 A1 | 6/1998 |
| FR | 2922468 A1 | 4/2009 |
| WO | 9709519 A1 | 3/1997 |

* cited by examiner

*Primary Examiner* — Jonathan R Matthias
(74) *Attorney, Agent, or Firm* — McGlew and Tuttle, P.C.

(57) ABSTRACT

An exhaust system for an internal combustion engine includes an exhaust gas-carrying component (16) with an outer wall (14), a heat conductor element (12) with a jacket (40) and with a heat conductor device (50) enclosed by the jacket (40). A pass-through device (22) provides a gastight passing of the heat conductor element (12) through the outer wall (14) of the exhaust gas-carrying component (16). The pass-through device (22) includes a pass-through opening (26) in the outer wall (14), which pass-through opening (26) is traversed by the heat conductor element (12), and a connection element (24), which is connected in a gastight manner to the heat conductor element (12), on the one hand, and to the outer wall (14), on the other hand.

17 Claims, 1 Drawing Sheet

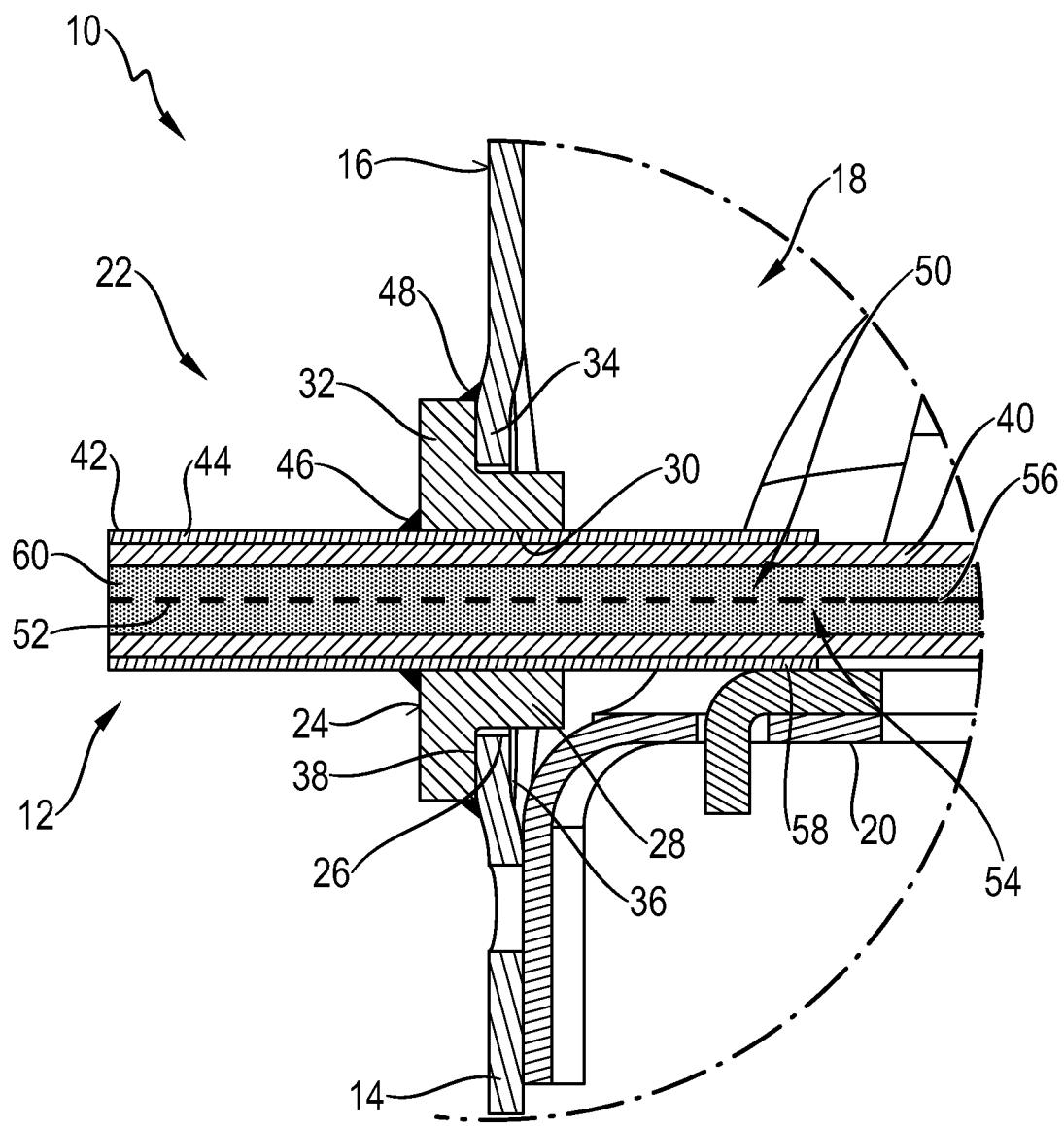

EXHAUST SYSTEM FOR AN INTERNAL COMBUSTION ENGINE AND PROCESS FOR MANUFACTURING AN EXHAUST SYSTEM

CROSS REFERENCE TO RELATED APPLICATIONS

This application claims the benefit of priority under 35 U.S.C. § 119 of German Application 10 2019 129 795.8, filed Nov. 5, 2019, the entire contents of which are incorporated herein by reference.

TECHNICAL FIELD

The invention pertains to an exhaust system for an internal combustion engine as well as to a process for manufacturing such an exhaust system.

TECHNICAL BACKGROUND

To reduce the nitrogen oxide content in the exhaust gases emitted by an internal combustion engine into the environment, it is known that a reactant, for example, a urea/water solution, is injected into the exhaust gas stream and a catalytic reaction reducing the nitrogen oxide content is carried out. In order to achieve good mixing of the liquid reactant, which is generally injected as a spray mist, with the exhaust gas, a mixer, which is, for example, plate-like and is configured with wings and which generates a swirling of the exhaust gas stream, on the one hand, and provides a surface heated by the exhaust gas stream, on the other hand, on which surface the reactant impinging thereon can be evaporated, is generally arranged between an injector injecting the reactant and the SCR catalytic converter device.

SUMMARY

A basic object of the present invention is to provide an exhaust system for an internal combustion engine and a process for the manufacture thereof, with which the introduction of heat for heating system areas of the exhaust system is made possible, for example, for the reinforced evaporation of a reactant injected into the exhaust gas stream.

This object is accomplished according to the present invention by an exhaust system for an internal combustion engine, comprising:

an exhaust gas-carrying component with an outer wall, a heat conductor element with a jacket and with a heat conductor device enclosed by the jacket, and a pass-through device for the gastight passing of the heat conductor element through the outer wall of the exhaust gas-carrying component, wherein the pass-through device comprises a pass-through opening in the outer wall, which pass-through opening is traversed by the heat conductor element, and a connection element, which is connected in a gastight manner to the heat conductor element, on the one hand, and to the outer wall, on the other hand.

With the configuration according to the present invention of an exhaust system, it is guaranteed, on the one hand, that due to the provision of the heat conductor element and the electrical excitement of same in the interior of the exhaust gas-carrying component, heat can be provided, which can be transferred to system areas arranged therein, for example, to a mixer. On the other hand, a direct connection of the heat conductor element to the outer wall of the exhaust gas-carrying component is avoided, which rules out the risk of damage to the heat conductor element when establishing such a connection and, in addition, facilitates the positioning of the heat conductor element traversing the pass-through opening with its longitudinal area located in the interior of the exhaust gas-carrying component in the installation position intended for it. Thus, for example, the evaporation of the reactant injected into the exhaust gas stream in the area of a mixer can be supported especially in a start phase of the combustion operation in an internal combustion engine, in which different system areas of the exhaust system are not yet sufficiently heated by the exhaust gas stream, in order to efficiently carry out the different physical processes and reactions, for example, the evaporation of the reactant injected into the exhaust gas stream in the area of a mixer, and thus, a selective catalytic reduction can also already be efficiently carried out in such a start phase. The configuration according to the present invention of an exhaust system may also be used in connection with other system areas of an exhaust system that are located in the interior of the exhaust system and are to be heated or to be preheated during the operation of the exhaust system and of an internal combustion engine.

In order to be able to further reduce the risk of damage to the heat conductor element in case of the connection to the outer wall of the exhaust gas-carrying component, it is proposed that the pass-through device comprise a thickened area of the jacket in a longitudinal section of the heat conductor element, which longitudinal section traverses the pass-through opening.

In a configuration that can be embodied in a structurally simple manner, the thickened area may be provided by a sleeve enclosing the jacket in a gastight manner, wherein especially advantageously the sleeve is connected in a gastight manner to the jacket by compressing, so that a connection in substance prepared, for example, by welding between the sleeve and the jacket is avoided. The plastic deformability of the sleeve necessary for generating such a compression can be achieved, for example, by the sleeve being made of metallic material.

In order to be able to configure the insertion and positioning of the heat conductor element in the installation position intended for this heat conductor element in the simplest manner possible, an internal cross-sectional dimension, preferably internal diameter, of the pass-through opening is at least 1.5 times an external cross-sectional dimension, preferably external diameter, of the heat conductor element in its longitudinal section traversing the pass-through opening.

It is possible to prevent in a reliable manner the leakage of exhaust gas from the exhaust system in the area of the connection of the heat conductor element by the connection element being connected in substance, preferably by welding, to the outer wall, or/and by the heat conductor element being connected in substance, preferably by welding, to the connection element.

To achieve a stable, gastight connection to the outer wall of the exhaust gas-carrying component, on the one hand, and to the heat conductor element, on the other hand, the connection element may comprise:

a heat conductor element connection area providing a heat conductor element receiving opening and meshing with the pass-through opening in the outer wall, and an outer wall connection area protruding outwards from the heat conductor element connection area and extending over an edge area of the outer wall, which edge area encloses the pass-through opening in the outer wall, wherein the heat conductor element connection area is connected in substance, preferably by welding, to the heat conductor element, and the outer wall connection area is connected in substance, preferably by welding, to the outer wall.

For stability reasons, it is advantageous if the jacket is made of metallic material. It is proposed for a configuration minimizing heat losses during the excitation of the heat conductor element that the heat conductor device comprise an electrical connecting conductor in a longitudinal section of the heat conductor element traversing the pass-through opening and a heat conductor adjoining the connecting conductor in the interior of the exhaust gas-carrying component. For this, it is especially advantageous if a transition from the connecting conductor to the heat conductor is located in the area of an end of the thickened area, which end is arranged in the interior of the exhaust gas-carrying component, preferably such that the transition is not enclosed by the thickened area.

The object mentioned in the introduction is further accomplished by a process for the assembly of an exhaust system according to the present invention, comprising the steps:
a) Provision of the exhaust gas-carrying element with the pass-through opening in the outer wall,
b) passing of the heat conductor element through the pass-through opening in the outer wall,
c) after carrying out step b), arrangement of the connection element at the heat conductor element such that the connection element is positioned in the area of the pass-through opening at the outer wall, and
d) after carrying out step c), gastight connection of the connection element to the outer wall and to the heat conductor element.

Step a) may comprise the provision of the heat conductor element with the thickened area, and step b) may comprise the passing of the heat conductor element through the pass-through opening in the outer wall such that the heat conductor element with the thickened area is positioned such that it extends through the pass-through opening.

In order to be able to position the heat conductor element for permanent connection to the outer wall in a suitable manner, it is proposed that in step c) the connection element be arranged at the heat conductor element such that the heat conductor element connection area is positioned such that it receives the heat conductor element in the heat conductor element receiving opening and such that it meshes with the pass-through opening, and that the outer wall connection area be positioned in contact with the outer wall such that it extends over the edge area of the outer wall.

Step c) may comprise a step c1) for the gastight connection of the connection element to the outer wall and after step c1) a step c2) for the gastight connection of the connection element to the heat conductor element. Thus, in this sequence, first the connection element is permanently connected to the exhaust gas-carrying component, so that, in principle, a fine adjustment of the heat conductor element in relation to the connection element is still possible when this connection element is already fixed to the outer wall. Only then is the heat conductor element permanently connected to the connection element.

For example, the connection element may be connected by welding to the outer wall or/and may be connected by welding to the heat conductor element in step c).

In order to be able to carry out the positioning of the heat conductor element in the exhaust gas-carrying component in the installation position intended for this even in case of more complicated shaping of the heat conductor element in a simple manner, step a) may comprise the provision of the exhaust gas-carrying component with the pass-through opening such that an internal cross-sectional dimension, preferably internal diameter, of the pass-through opening is at least 1.5 times an external cross-sectional dimension, preferably external diameter, of the heat conductor element in its longitudinal section to be positioned such that it traverses the pass-through opening.

The present invention will be described in detail below with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1 is a sectional view of an exhaust gas-carrying component in an area of the passing of a heat conductor element through an outer wall of the exhaust gas-carrying component.

DESCRIPTION OF PREFERRED EMBODIMENTS

Referring to the drawings, FIG. 1 shows a section of an exhaust system generally designated by 10 of an internal combustion engine in a vehicle, in which a heat conductor element 12 is passed through an outer wall 14 of an exhaust gas-carrying component 16. The exhaust gas-carrying component 16 may be, for example, an exhaust gas pipe or a housing that is arranged upstream of an SCR catalytic converter device or a housing containing this device, the pipe wall provided by the outer wall or the housing wall defining a volume 18 through which exhaust gas can flow. A mixer 20, which is configured, for example, as a shaped sheet metal part and is shown in the example, is arranged in the interior of the exhaust gas-carrying component 16. The mixer 20 swirls the exhaust gas stream and hereby supports the mixing of the exhaust gas and the reactant injected into this exhaust gas and provides a surface, at which the reactant impinging thereon can be evaporated. This evaporation can be supported by excitation of the heating conductor element 12 and thus heating of the mixer 20, especially in a start phase of the combustion operation of an internal combustion engine.

A pass-through device, which is generally designated by 22 and guarantees a gastight passing of the heat conductor element 12 through the outer wall 14, comprises a connection element 24 that has a T-shaped configuration in cross section and a pass-through opening 26 formed in the outer wall 14. The connection element 24 has a heat conductor element connection area 28 positioned such that it meshes with the pass-through opening. A heat conductor element receiving opening 30, through which the heat conductor element 12 extends, is formed in the heat conductor element connection area 28. The connection element 24 has, furthermore, an outer wall connection area 32 protruding radially outwards from the heat conductor element connection area 28 in relation to a longitudinal central axis of the heat conductor element receiving opening 30. This outer wall connection area 32 extends over an edge area 34 of the outer wall 14 on its outer side, which edge area encloses the pass-through opening 26 in the outer wall 14. The pass-through opening 26 can be provided in a bulged area 36 of the outer wall 14, for example, in the case of a generally round cross-sectional contour of the outer wall 14, so that the edge area 34 provides an uncurved, flat contact surface 38 for the outer wall connection area 32 and thus a flat contact of same in the entire circumference.

The heat conductor element 12 comprises a jacket 40 which is advantageously made of metallic material. The jacket 40 is configured with a thickened area 42 in the area, in which the heat conductor element 12 traverses the connection element 24 and thus also the pass-through opening 26 in the outer wall 14. For example, the thickened area 42 may be provided by a sleeve made of metallic material, which is connected in a gastight manner by compression to the jacket 40. A connection in substance, which is prepared, for example, by welding, between the sleeve 44 and the jacket 40, which could lead to damage to the heat conductor element 12 because of the heat that is unavoidably introduced during the process, is avoided in this manner.

The heat conductor element 12 is connected in substance by welding and thus in a gastight manner to the connection element 24 in the area of the thickened area 42, which may extend a few mm or cm on both sides of the connection element 24. For example, a weld seam 46, which extends over the entire circumference of the thickened area 42 and of the sleeve 44, may be prepared. A weld seam extending over the entire circumference of the connection element 24 or of the outer wall connection area 32 may likewise be provided for generating a stable, gastight connection of the connection element 24 to the outer circumference wall 14.

Different advantages are achieved with the configuration of the exhaust system 10 and of the pass-through device 22 shown in FIG. 1. On the one hand, direct contact of the heat conductor element 12 with the outer wall 14 is avoided with such a configuration. Also, the heat conductor element connection area 28 positioned such that it meshes with the pass-through opening 26 generates a defined positioning of the heat conductor element 12 in the pass-through opening 26. Since the pass-through opening 26 can thus be made markedly larger with its internal cross-sectional dimension, i.e., for example, with its internal diameter in case of a circular configuration, than an external cross-sectional dimension, for example, external diameter, of the heat conductor element 12 in its longitudinal area traversing the pass-through opening 26, i.e., especially in the area of the thickened area 42 provided at the jacket 40, it is possible to insert the heat conductor element 12 during the assembly of the exhaust system 10 even if this heat conductor element has a curved extension, for example, for adaptation to the contour of the mixer 12, into the exhaust gas-carrying component 16 in case of a mixer 20 already mounted on it and to position same in a suitable manner in relation to the mixer 20. The weld seams 46, 48 to be prepared for the permanent connection to the outer wall 14 are then prepared in areas, which cannot lead to a thermal overload of the heat conductor element 12 during the carrying out of the welding operations.

For example, it is possible to proceed during the assembly of the exhaust system 10 such that first the exhaust gas-carrying component 16 is provided with the pass-through opening 26 in the outer wall 14 of same and, for example, with the mixer 20 already mounted on the outer wall 14. The heat conductor element 12 may be provided with the thickened area on the jacket 40 of same, for example, by mounting and compression of the sleeve 44 and be inserted from outside, i.e., from the left in FIG. 1, through the pass-through opening 26 into the volume 18 with its longitudinal area to be positioned in the interior of the exhaust gas-carrying component 16. In this state, the connection element 24 is not yet provided at the heat conductor element 12 or is positioned, for example, such that it encloses the heat conductor element 12 in the area of the thickened area 42, but not in its position intended for the final installation. When the heat conductor element 12 is positioned in an essentially suitable manner in relation to the exhaust gas-carrying component 16, the connection element 24 is then pushed onto the heat conductor element 12 in the area of the thickened area 42 or is displaced on the thickened area 42 such that the connection element 24 is positioned in the exhaust gas-carrying component 16 in relation to the outer wall 14, shown in FIG. 1 for final installation such that when the heat conductor element 12 traverses the heat conductor receiving opening 30 in the heat conductor element connection area 28, the heat conductor element connection area 28 is positioned such that the connection element 24 meshes with the pass-through opening 26 and the outer wall connection area 32 is in contact with the edge area 34 of the outer wall 14.

Then, for example, first the weld seam 48 can be prepared to position the connection element 24 in a fixed and thus defined manner in relation to the outer wall 14. The heat conductor element 12 can then always still be displaced in relation to the connection element 24 in the direction of the longitudinal axis of the heat conductor element receiving opening 30 and be rotated about this axis, so that a fine adjustment of the heat conductor element 12 may also still be made. If this is carried out, the heat conductor element 12 can be connected permanently and in a gastight manner to the connection element 24 by preparing the weld seam 46 in the area of the thickened area 42. Before or after this step, for example, the longitudinal area of the heat conductor element 12 extending in the volume 18 can be clamped by a clamping element in a fixed manner in relation to the mixer 20 in order to avoid the development of clapping noises during the operation, on the one hand, and to be able to predefine the defined positioning of the heat conductor element 12 for the preparation of the weld seam 46, on the other hand. This clamping may also be carried out, for example, already before preparation of the weld seam 48 or before the step for positioning the connection element 24 in its installation position. In principle, this step for fixed clamping of the heat conductor element 12 in relation to the mixer 20 could also be carried out only if the heat conductor element 12 is connected permanently and in a gastight manner to the connection element 24 and the connection element 24 is connected permanently and in a gastight manner to the outer wall 14.

FIG. 1 illustrates another especially advantageous aspect of the exhaust system 10 as configured according to the present invention, which may lead to the avoidance of heat losses especially during the heating operation of the heat conductor element 12. The heat conductor element 12 comprises a heat conductor device 50 in the jacket 40. The heat conductor device 50 comprises an electrically contacted connecting conductor 52, for example, on the outer side of the exhaust gas-carrying component 16, which connecting conductor may be made of an electrically conductive material with relatively low electrical resistance, e.g., copper material. Essentially no heat will be generated in the area of the connecting conductor 52 when an electrical voltage and current flow generated by it are applied by the heat conductor device 50.

A heat conductor 56 adjoins the connecting conductor 52 at a transition generally designated by 54. This heat conductor 56 is made of such a material that the electrical current flowing through the heat conductor device 50 leads to a heating of the heat conductor 56 and thus essentially to the thermal activity of the heat conductor element 12. Advantageously, the transition 54 is positioned such that the transition 54 is positioned in the area of the end 58 of the thickened area 42 or of the sleeve 44, which end 58 is located in the volume 18, i.e., in the interior of the exhaust gas-carrying component 16. In this case, an embodiment, in which the transition 54 is not covered by the thickened area 42, is particularly advantageous. The thermally active area of the heat conductor element 12 thus begins in an area, which has a comparatively great distance to the connection element 24, on the one hand, and thus also to the outer wall 14, and which is essentially not overlapped by the thickened area 42, on the other hand. Heat losses via the jacket 40, the thickened area 42, the connection element 24 and the outer wall 14 can thus be markedly reduced.

The heat conductor device 50 is enclosed in the jacket 40 by electrically insulating material 60, for example, magnesium oxide or the like, and is thus electrically insulated in the interior of the jacket 40 in relation to same. In the end area located in the interior of the exhaust gas-carrying component 16, the heat conductor device 50 can then be connected in a conductive manner to the jacket 40, so that this jacket can provide the second electrical contact, especially the ground potential. It should be pointed out that the heat conductor element 12, as an alternative, may also be configured with two conduction areas extending in the interior of the jacket 40 and held in relation to same in an electrically insulated manner, which conduction areas may be arranged, for example, coaxially to each other, so that the jacket 40 itself is not active in an electrically conductive manner.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
    an exhaust gas-carrying component with an outer wall;
    a heat conductor element comprising a jacket and a heat conductor device enclosed by the jacket; and
    a pass-through device for a gastight passing of the heat conductor element through the outer wall of the exhaust gas-carrying component, wherein the pass-through device comprises a pass-through opening in the outer wall traversed by the heat conductor element and the pass-through device further comprises a connection element gastightly connected to the heat conductor element and also gastightly connected to the outer wall in substance, the pass-through device further comprising a thickened area of the jacket in a longitudinal section of the heat conductor element, which longitudinal section traverses the pass-through opening, the thickened area of the jacket of the heat conductor element being connected in substance to the connection element, wherein the connection element comprises:
        a heat conductor element connection area providing a heat conductor element receiving opening and meshing with the pass-through opening in the outer wall; and
        an outer wall connection area protruding outwards from the heat conductor element connection area and extending over an edge area of the outer wall, which edge area encloses the pass-through opening in the outer wall, wherein:
            the heat conductor element connection area is connected in substance to the heat conductor element; and
            the outer wall connection area is connected in substance to the outer wall.

2. The exhaust system in accordance with claim 1, wherein the thickened area is provided by a sleeve gastightly enclosing the jacket.

3. The exhaust system in accordance with claim 2, wherein:
    the sleeve is gastightly connected to the jacket by compressing; or
    the sleeve is made of metallic material; or
    the sleeve is gastightly connected to the jacket by compressing and the sleeve is made of metallic material.

4. The exhaust system in accordance with claim 1, wherein an internal cross-sectional dimension of the pass-through opening is at least 1.5 times an external cross-sectional dimension of the heat conductor element in the longitudinal section traversing the pass-through opening.

5. The exhaust system in accordance with claim 1, wherein:
    the jacket is made of metallic material; or
    the heat conductor device comprises an electrical connecting conductor in a longitudinal section of the heat conductor element traversing the pass-through opening and a heat conductor which adjoins the connecting conductor in the interior of the exhaust gas-carrying component; or
    the jacket is made of metallic material and the heat conductor device comprises an electrical connecting conductor in a longitudinal section of the heat conductor element traversing the pass-through opening and a heat conductor which adjoins the connecting conductor in the interior of the exhaust gas-carrying component.

6. The exhaust system in accordance with claim 5, wherein:
    the pass-through device further comprises a thickened area of the jacket in a longitudinal section of the heat conductor element, which longitudinal section traverses the pass-through opening; and
    a transition from the connecting conductor to the heat conductor is located in the area of an end of the thickened area, which end is arranged in the interior of the exhaust gas-carrying component such that the transition is not enclosed by the thickened area.

7. The exhaust system in accordance with claim 1, wherein the connection element is connected to the outer wall by welding.

8. The exhaust system in accordance with claim 1, wherein the heat conductor element is configured to generate heat when an electric voltage is applied to the heat conductor element.

9. A process for the assembly of an exhaust system comprising an exhaust gas-carrying component with an outer wall, a heat conductor element comprising a jacket and a heat conductor device enclosed by the jacket, and a pass-through device for a gastight passing of the heat conductor element through the outer wall of the exhaust gas-carrying component, wherein the pass-through device comprises a pass-through opening in the outer wall traversed by the heat conductor element and the pass-through device further comprises a connection element gastightly connected to the heat conductor element and also gastightly connected to the outer wall, the process comprising the steps of:
provid ing the exhaust gas-carrying element with the pass-through opening in the outer wall of the exhaust gas-carrying element;
passing the heat conductor element through the pass-through opening in the outer wall;
after carrying out the step of passing, arranging the connection element at the heat conductor element such that the connection element is positioned in an area of the pass-through opening at the outer wall; and
after carrying out step of arranging, gastightly connecting the connection element to the outer wall and to the heat conductor element, wherein the connection element is gastightly connected to the outer wall in substance, the pass-through device comprising a thickened area of the jacket in a longitudinal section of the heat conductor element, which longitudinal section traverses the pass-through opening, the thickened area of the jacket of the heat conductor element being connected to the connection element by welding.

10. The process in accordance with claim 9, wherein:
the step of providing the exhaust gas-carrying element with the pass-through opening in the outer wall of the exhaust gas-carrying element comprises providing the heat conductor element with the thickened area.

11. The process in accordance with claim 9, wherein:
the connection element comprises a heat conductor element connection area providing a heat conductor element receiving opening and meshing with the pass-through opening in the outer wall and an outer wall connection area protruding outwards from the heat conductor element connection area and extending over an edge area of the outer wall, which edge area encloses the pass-through opening in the outer wall, wherein the heat conductor element connection area is connected in substance to the heat conductor element and the outer wall connection area is connected in substance to the outer wall; and
the step of arranging a connection element at the heat conductor element such that the connection element is positioned in an area of the pass-through opening at the outer wall includes arranging the connection element at the heat conductor element such that the heat conductor element connection area is positioned such that the heat conductor element connection area receives the heat conductor element in the heat conductor element receiving opening and such that the heat conductor element connection area meshes with the pass-through opening, and such that the outer wall connection area is positioned in contact with the outer wall and extends over an edge area of the outer wall.

12. A process in accordance with claim 9, wherein the step of arranging the connection element at the heat conductor element such that the connection element is positioned in an area of the pass-through opening at the outer wall comprises gastightly connecting the connection element to the outer wall and subsequent thereto gastightly connecting the connection element to the heat conductor element.

13. A process in accordance with claim 9, wherein:
during the step of arranging the connection element at the heat conductor element such that the connection element is positioned in an area of the pass-through opening at the outer wall, the connection element is connected by welding to the outer wall; or
during the step of arranging the connection element at the heat conductor element such that the connection element is positioned in an area of the pass-through opening at the outer wall, the connection element is connected by welding to the heat conductor element; or
during the step of arranging the connection element at the heat conductor element such that the connection element is positioned in an area of the pass-through opening at the outer wall, the connection element is connected by welding to the outer wall and the connection element is connected by welding to the heat conductor element.

14. A process in accordance with claim 9, wherein the step of providing the exhaust gas-carrying element with the pass-through opening in the outer wall of the exhaust gas-carrying element comprises providing the exhaust gas-carrying component with the pass-through opening such that an internal cross-sectional dimension of the pass-through opening is at least 1.5 times an external cross-sectional dimension of the heat conductor element in a longitudinal section to be positioned such that the longitudinal section traverses the pass-through opening.

15. An exhaust system for an internal combustion engine, the exhaust system comprising:
an exhaust gas-carrying component comprising an outer wall;
a heat conductor element comprising a jacket and a heat conductor device enclosed by the jacket; and
a pass-through device for a gastight passing of the heat conductor element through the outer wall of the exhaust gas-carrying component, wherein the pass-through device comprises a pass-through opening in the outer wall traversed by the heat conductor element and the pass-through device further comprises a connection element gastightly connected to the heat conductor element and also gastightly connected to the outer wall via a welded connection, the pass-through device further comprising a thickened area of the jacket in a longitudinal section of the heat conductor element, the longitudinal section extending through the pass-through opening, wherein a portion of the thickened area of the jacket of the heat conductor element is in direct contact with the connection element and is connected to the connection element via a welded connection.

16. The exhaust system in accordance with claim 15, wherein the heat conductor element is configured to generate heat when an electric voltage is applied to the heat conductor element.

17. The exhaust system in accordance with claim 15, wherein the thickened area is provided by a sleeve gastightly enclosing the jacket, the sleeve being in direct contact with the jacket.

* * * * *